United States Patent [19]
Stankiewicz

[11] Patent Number: 5,996,736
[45] Date of Patent: Dec. 7, 1999

[54] LADDER LOCKING DEVICE

[75] Inventor: Danny Stankiewicz, 3063 W. 136 St., Cleveland, Ohio 44111

[73] Assignee: Danny Stankiewicz, Cleveland, Ohio

[21] Appl. No.: 09/038,298

[22] Filed: Mar. 11, 1998

[51] Int. Cl.[6] ...................................................... E06C 5/00
[52] U.S. Cl. ............... 182/127; 248/231.41; 248/229.12; 70/209
[58] Field of Search ................................ 182/127; 70/18, 70/19, 209, 211; 292/149, 294; 248/210, 231.41, 229.12, 229.22, 228.3, 211

[56] References Cited

U.S. PATENT DOCUMENTS

| 3,893,568 | 7/1975 | Lile . | |
|---|---|---|---|
| 3,909,094 | 9/1975 | Correll . | |
| 3,963,136 | 6/1976 | Spanke . | |
| 4,101,061 | 7/1978 | Sage et al. ...................... | 248/231.41 X |
| 4,339,064 | 7/1982 | Ziaylek, Jr. . | |
| 4,390,117 | 6/1983 | Fagan . | |
| 4,413,801 | 11/1983 | Lancaster et al. . | |
| 4,618,083 | 10/1986 | Weger, Jr. . | |
| 4,751,981 | 6/1988 | Mitchell et al. . | |
| 4,813,585 | 3/1989 | Nutt . | |
| 5,121,617 | 6/1992 | Chen .......................................... | 70/209 |
| 5,137,320 | 8/1992 | Christensen . | |
| 5,154,258 | 10/1992 | Krukow .................................. | 182/127 |
| 5,186,588 | 2/1993 | Sutton et al. . | |
| 5,242,094 | 9/1993 | Finley . | |
| 5,284,371 | 2/1994 | Richardson et al. ..................... | 292/149 |
| 5,398,778 | 3/1995 | Sexton . | |
| 5,469,933 | 11/1995 | Thomason . | |
| 5,513,890 | 5/1996 | Christensen . | |

*Primary Examiner*—Daniel P. Stodola
*Assistant Examiner*—Hugh B. Thompson
*Attorney, Agent, or Firm*—Fay, Sharpe, Beall, Fagan, Minnich & McKee, LLP

[57] ABSTRACT

A ladder locking device used for securing ladders on truck and van racks with the ability to tighten and lock the ladder in place, providing safety and theft deterrent for the consumer. The ladder locking device includes a handle, a hook, and a locking arm assembly including a hook, and a threaded key mechanism. The hook accommodates a ladder rack. The handle can include a threaded tightening shaft which rotates through a threaded tightening shaft receiver in the locking arm assembly, moving the locking arm assembly hook against a ladder rung. The locking arm assembly can be extended to accommodate up to five ladders. A key is inserted into and rotates the threaded key mechanism, thus rotating a threaded shaft attached to the threaded key mechanism. Locking pins within the ladder locking device are then pushed downward by spring mechanisms and by the threaded shaft. The locking pins then extend through holes in the locking arm assembly, locking the locking arm assembly in place.

19 Claims, 3 Drawing Sheets

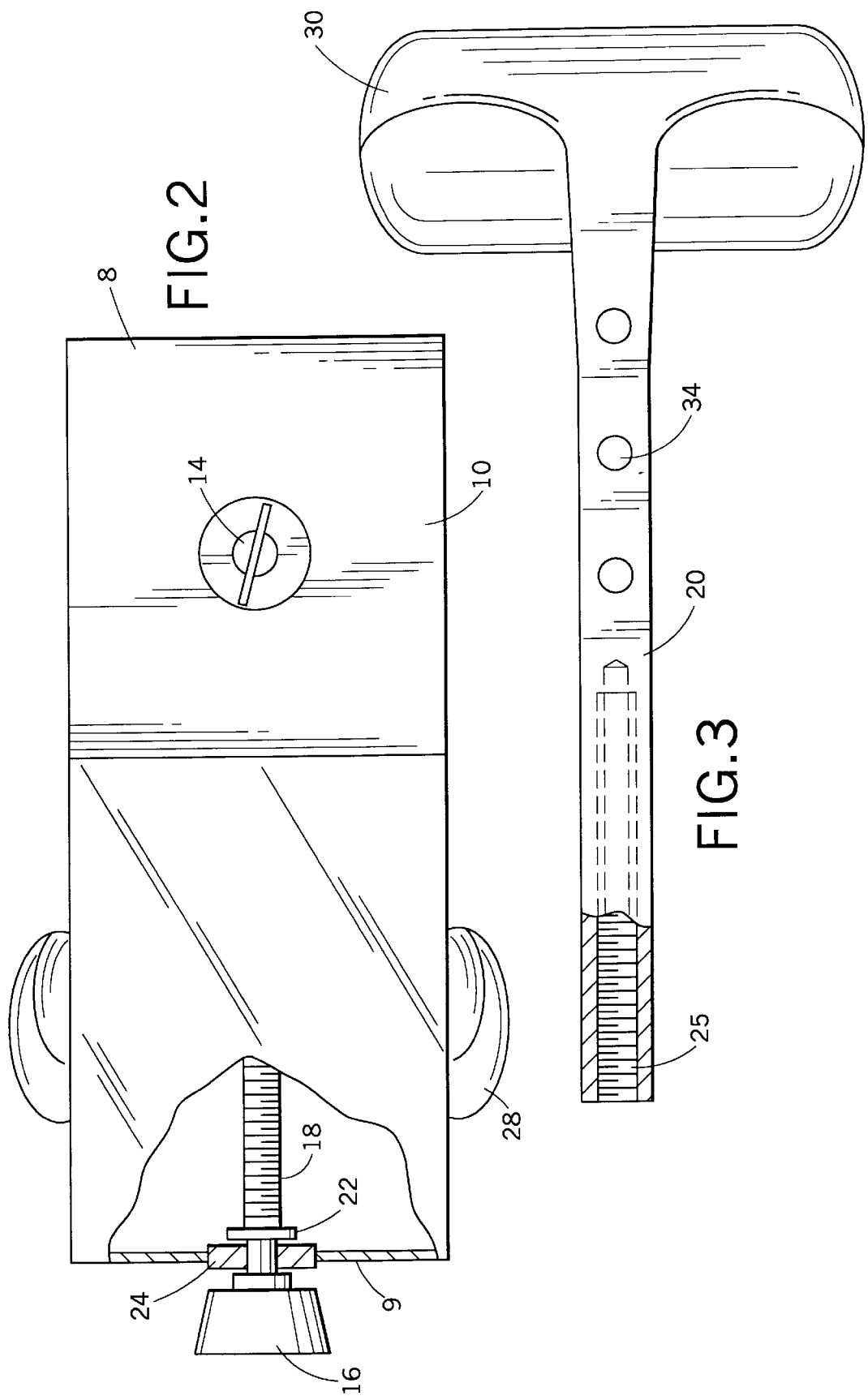

LADDER LOCKING DEVICE

BACKGROUND OF THE INVENTION

The present invention relates to ladder locking devices. More particularly, it relates to an improved ladder locking device for use with securing ladders on truck and van racks with the ability to tighten and lock the ladder in place, providing safety and theft deterrent for the consumer.

It is common for businesses or service personnel to transport ladders on ladder racks mounted on the top of trucks or vans. It is necessary that the ladder be secured to the ladder rack to hold the ladder in place while the vehicle is moving.

It is also desirable that the locking device lock the ladder to the rack to prevent unauthorized removal of the ladder.

Ladder locking racks have been known for some time. One known device is shown in U.S. Pat. No. 4,813,585. This device is a rack with a horizontal frame with a hooked clamping bar at one end which pivots from a release position to a clamped position. A disadvantage of this device is that it does not accommodate more than one ladder. Another disadvantage of this device is that it does not have a hook to mount to a separate rack.

Another device is disclosed in U.S. Pat. No. 5,154,258. This device is a lockable ladder securing bracket which has a spring loaded pivoting ladder which engages a ladder rung and is secured in position. A disadvantage of this device is that it does not accommodate more than one ladder. Another disadvantage of this device is that it does not have a hook to mount to a separate rack.

Another device is disclosed in U.S. Pat. No. 5,186,588. This device is a latch for securing a ladder to a ladder rack on a vehicle having cross brace formed by a latch body rigidly secured to the cross brace. A disadvantage of this device is that it does not accommodate more than one ladder.

Accordingly, it has been considered desirable to develop a new and improved ladder locking device which would overcome the foregoing difficulties and others while providing better and more advantageous results.

SUMMARY OF THE INVENTION

The present invention relates to ladder locking devices for use with truck and van racks to secure ladders with the ability to tighten and also lock the ladder down, thus providing safety and theft deterrent for the consumer.

More specifically, the ladder locking device is also designed to be adjustable in that it can accommodate additional ladders. It will change to the size needed simply by changing the locking arm assembly and will accommodate up to five ladders. The device can be coated in a rubber-like protective material to resist damage due to weather. The internal parts can also be made of a high tensile-strength material for locking security.

In a preferred embodiment, the ladder locking device comprises a body having a first end, a second end, a hollow section, and a longitudinal axis. A handle and a hook are attached to the first end of the body. The hook accommodates a ladder rack.

A locking arm assembly extends from the first end of the body to the second end of the body through the hollow section of the body along the longitudinal axis. The locking arm assembly comprises a hook.

A threaded key mechanism is attached to the second end of the body to accommodate a key. The threaded key mechanism includes a threaded shaft.

The handle can further include a threaded tightening shaft secured to the end of the handle. The threaded tightening shaft is secured to the body by a locking clip. The handle rotates on a bearing and rotates the threaded tightening shaft.

The locking arm assembly can further include a threaded tightening shaft receiver. The threaded tightening shaft threads into the receiver thus drawing the locking arm assembly to a tight locking position against a ladder rung.

The locking arm assembly can be extended in length to accomodate up to five ladders.

The body can further include a drain hole to prevent moisture from being trapped inside the ladder locking device.

The hollow section of the body can be comprised of locking pins, a pin retainer body, guide tracks, spring mechanisms, a retaining plate to retain the pins and the spring mechanisms, and pre-aligned pin seats to accommodate the pins.

The locking arm assembly can further comprise holes to accommodate the pins.

The threaded key mechanism is rotated by a key, thus allowing rotation of the threaded shaft and downward sliding of the pin retainer body along the guide tracks to seat the locking pins into the pin seats. The spring mechanisms provide downward pressure to the pins and push the pins through the holes of the locking arm assembly and seat the pins in the pin seats, locking the locking arm assembly into position.

One advantage of the present invention is the provision of a ladder locking device having a handle attached to a first end, a hook attached to the first end, and a locking arm assembly extending from the first end to a second end and comprising a hook.

Another advantage of the present invention is the provision of a ladder locking device having a threaded tightening shaft which threads into a receiver thus drawing the locking arm assembly into a tight locking position against a ladder rung.

Still another advantage of the present invention is the provision of a ladder locking device having a locking arm assembly which can be extended in length to accommodate up to five ladders.

Yet another advantage of the present invention is the provision of a ladder locking device which is detachable from a ladder rack.

Still yet another advantage of the present invention is the provision of a ladder locking device having locking pins which are received by holes in the locking arm assembly and seat in pin seats to lock the locking arm assembly in position.

Still other benefits and advantages of the present invention will become apparent to those skilled in the art upon a reading and understanding of the following detailed description.

BRIEF DESCRIPTION OF THE DRAWINGS

The invention may take form in various components and arrangements of components, and in various steps and arrangements of steps. The drawings are only for purposes of illustrating a preferred embodiment and are not to be construed as limiting the invention.

FIG. 2 is a top elevational view of the ladder locking device;

FIG. 3 is a top elevational view of the locking arm assembly of the ladder locking device;

DETAILED DESCRIPTION OF THE PREFERRED EMBODIMENT

Figure 1:
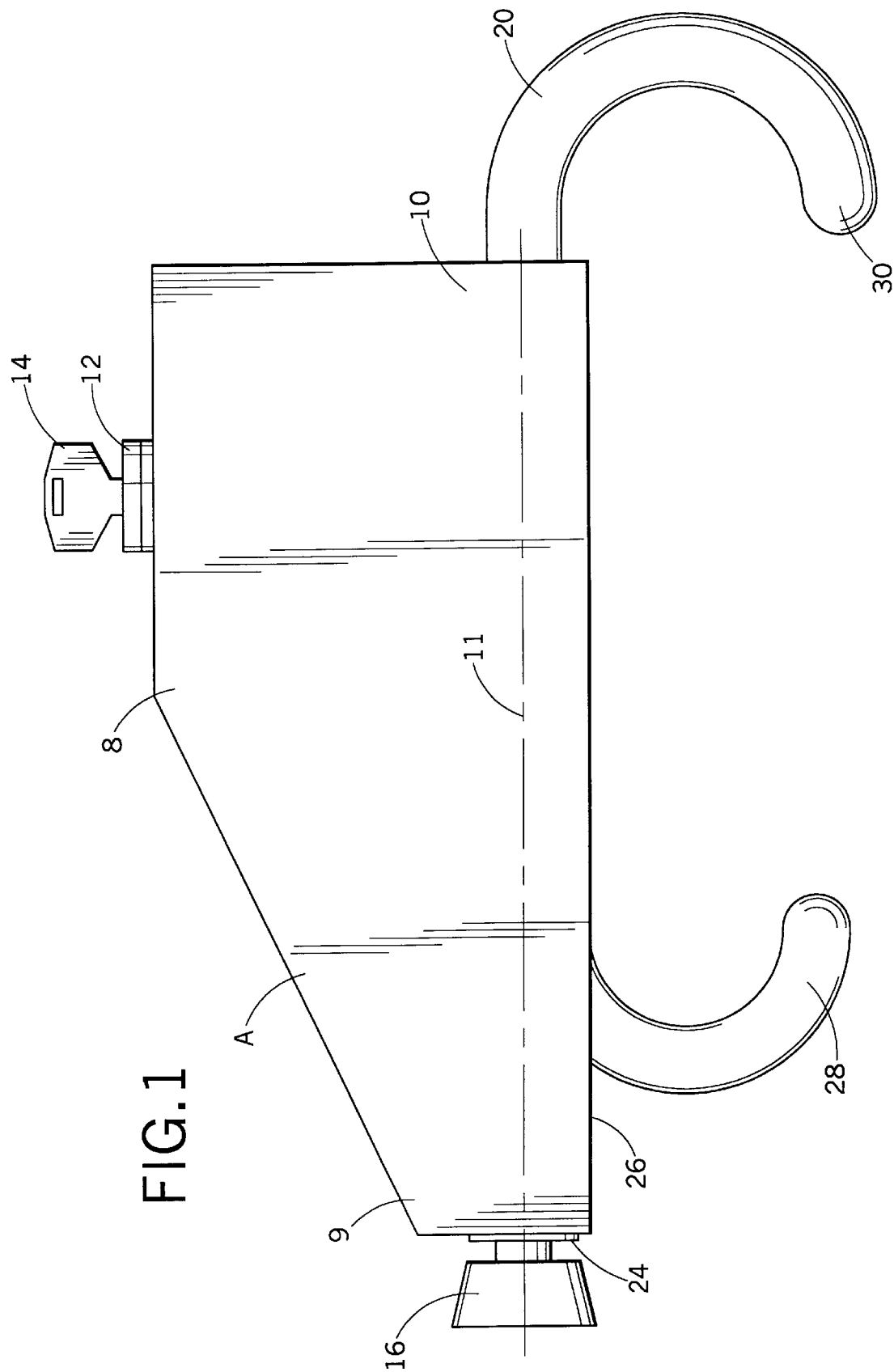
FIG. 1 is a side elevational view of a ladder locking device in accordance with a preferred embodiment of the present invention.

Referring now to the drawings, wherein the showings are for purposes of illustrating preferred embodiments of this invention only and not for purposes of limiting same, FIG. 1 shows a side view of the body 8 of the ladder locking device A.

As shown in FIG. 1, the body 8 includes a first end 9, a second end 10, and a longitudinal axis 11. The body 8 further includes a threaded key mechanism 12 into which a key 14 is inserted. The body 8 further includes a handle 16, a coarse thread tightening shaft 18 (shown in FIG. 2 and FIG. 4) and a locking arm assembly 20. The handle 16 of the coarse thread tightening shaft 18 turns to tighten down the locking arm assembly 20. A larger size handle 16 can be provided to allow the desired torque to occur for clamping purposes.

Referring now to FIG. 2, the key 14 is placed into the second end 10 of the body 8. The coarse threaded tightening shaft 18 is retained to the first end 9 of the body 8 by a locking clip 22 to ensure against movement due to vibration. The handle 16 is turned freely on the bearing 24 thus rotating the coarse threaded tightening shaft 18.

Referring now to FIG. 3, the coarse threaded tightening shaft 18 is received by a coarse threaded tightening shaft receiver 25 in the locking arm assembly 20. As the coarse threaded tightening shaft 18 is rotated, the receiver 25 of the locking arm assembly 20 moves with respect to the coarse threaded tightening shaft 18, moving the locking arm assembly 20 to a tight locking position against an associated ladder rung (not shown).

Referring again to FIG. 1, the body 8 holds all parts in proper position and further includes a drain hole 26 to prevent moisture from being trapped inside the locking device. The body 8 further includes a hook 28 located on the bottom of the first end 9 of the body 8 which rests against a ladder rack (not shown). The locking arm assembly 20 includes a hook 30 which secures a ladder rung (not shown) to the ladder locking device A.

More specifically, the ladder locking device A is also designed to be adjustable to accommodate additional ladders. It will change to the size needed simply by changing the length of the locking arm assembly 20 and will accommodate up to five ladders. The body 8 can be coated in a rubber-like protective material to resist damage due to weather. The internal parts can also be made of a high tensile-strength material for locking security.

Figure 4:
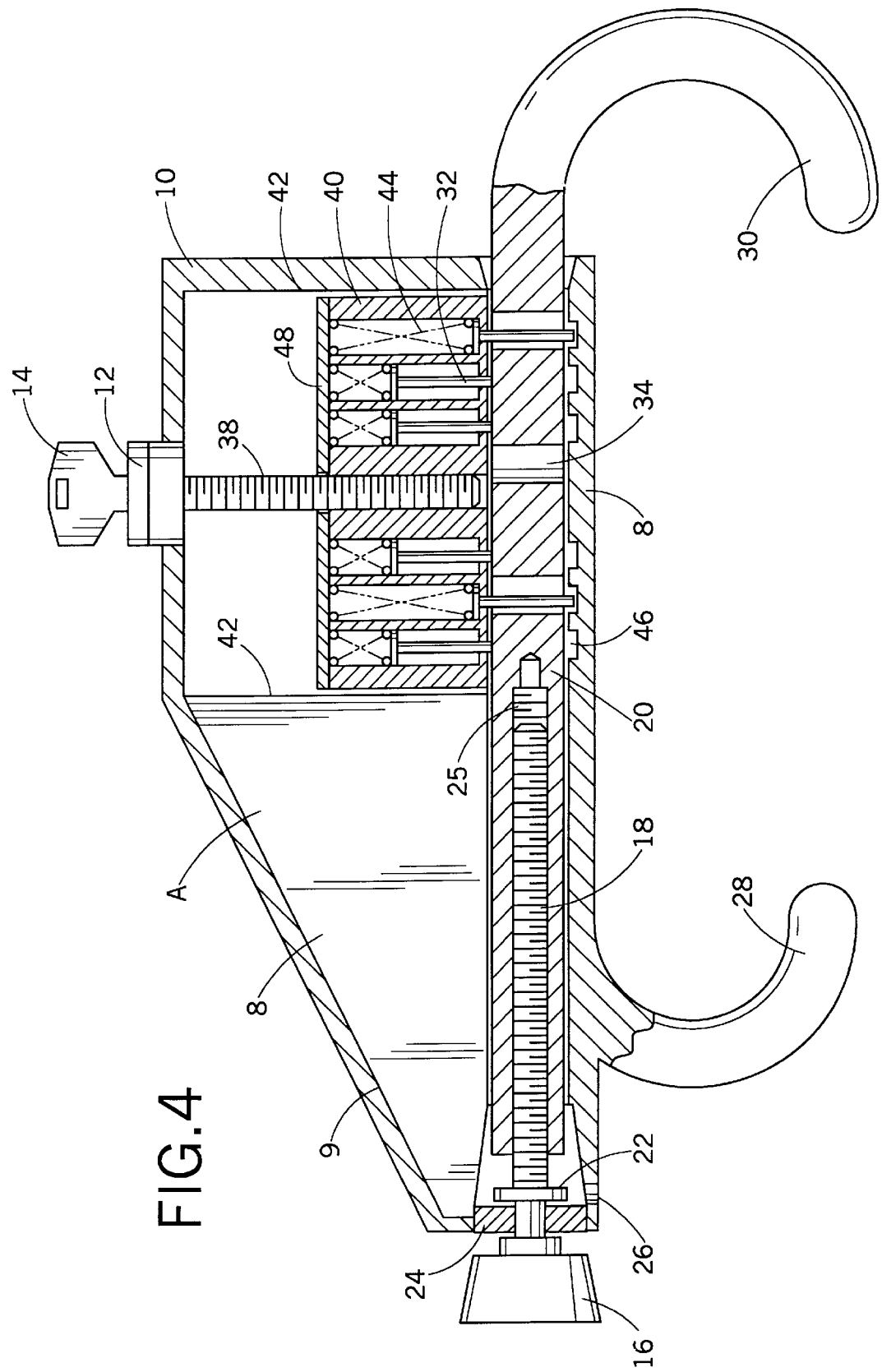
FIG. 4 is a side elevational view in cross section of the ladder locking device.

Referring now to FIG. 3 and 4, locking pins 32 are placed through holes 34 spaced for adjustability in the locking arm assembly 20. FIG. 3 illustrates the depth of the coarse threaded tightening shaft receiver 25 for the clamping motion. As shown in FIG. 3, the locking arm assembly 20 includes the hook 30 for the ladder rung (not shown) at one end and the coarse thread tightening shaft receiver 25 at the other end.

Referring now to FIG. 4, the interaction of the various internal parts of the ladder locking device A is shown. The key 14 is placed in the threaded key mechanism 12 which then turns the threaded shaft 38, sliding the pin retainer body 40 down the guide tracks 42 to seat the locking pins 32 that line up dependent on adjustment. Springs 44 located atop the pins 32 provide downward pressure to push the pins 32 through the holes 34 in the locking arm assembly 20 and seat the pins 32 into the pre-aligned pin seats 46 in the body 8. The pins 32 and springs 44 are retained in the pin retainer body 40 by the retaining plate 48.

The pins 32 engage the holes 34 of the locking arm assembly 20, thus locking the locking arm assembly 20 in place against an associated ladder rung. The key 14 is then removed from the threaded key mechanism 12. The holes 34 can be larger in diameter than the pins 32 to accommodate various alignments of the pins 32 with respect to the holes 34.

The invention has been described with reference to a preferred embodiment. Obviously, alterations and modifications will occur to others upon a reading and understanding of this specification. It is intended to include all such modifications and alterations insofar as they come within the scope of the appended claims or the equivalents thereof.

Having thus described the preferred embodiment, the invention is now claimed to be:

1. A ladder locking device, comprising:
    a body having opposed first and second ends, a hollow section and a longitudinal axis;
    said body further includes a drain hole to prevent moisture from being trapped inside said ladder locking device;
    a handle attached to said first end, said handle includes a threaded tightening shaft secured to said handle and to said body by a locking clip;
    a hook attached to said first end;
    a locking arm assembly extending from said first end to said second end through said hollow section of said body along said longitudinal axis of said body, said locking arm assembly comprising a hook, said locking arm assembly can be extended in length to receive up to five associated ladders;
    a threaded key mechanism attached to said second end, said threaded key mechanism comprises a threaded shaft and receives an associated key;
    said hollow section of said body further comprises:
    first and second guide tracks located on opposite sides of said hollow section; and
    a pin retainer body secured to said threaded shaft.

2. The ladder locking device of claim 1 wherein said handle rotates on a bearing and rotates said threaded tightening shaft.

3. The ladder locking device of claim 1 wherein said locking arm assembly further comprises a threaded tightening shaft receiver.

4. The ladder locking device of claim 3 wherein said threaded tightening shaft threads into said threaded tightening shaft receiver thus moving said locking arm assembly to a tight locking position against an associated ladder rung.

5. The ladder locking device of claim 1 wherein said hook attached to said body engages an associated ladder rack.

6. The ladder locking device of claim 1 wherein said pin retainer body further comprises:
    a retaining plate secured to said threaded shaft,
    spring mechanisms located below and engaging said retaining plate,
    one or more locking pins located below and engaging said spring mechanisms;
    said body further includes pre-aligned pin seats located in said body which receive said pins.

7. The ladder locking device of claim 6 wherein said locking arm assembly further comprises holes to receive said pins.

8. A ladder locking device, comprising:
   a body having opposed first and second ends, a hollow section and a longitudinal axis;
   a handle attached to said first end;
   a threaded tightening shaft attached to an end of said handle and secured to said body by a locking clip;
   a hook attached to said first end;
   a threaded key mechanism attached to said second end, said threaded key mechanism comprises a threaded shaft;
   said hollow section comprises:
      first and second guide tracks located on opposite sides of said hollow section,
      a pin retainer body secured to said threaded shaft, said pin retainer body comprises:
      a retaining plate secured to said threaded shaft,
      spring mechanisms located below and engaging said retaining plate, and
      one or more locking pins located below and engaging said spring mechanisms;
   pre-aligned pin seats located in said body which receive said pins;
   a locking arm assembly extending from said first end to said second end through said hollow section of said body along said longitudinal axis of said body, said locking arm assembly comprising a hook and holes to accommodate said pins,
   wherein said threaded key mechanism is rotated by an associated key, thus allowing rotation of said threaded shaft and downward sliding of said pin retainer body along said guide tracks, thus moving said pins through said holes of said locking arm assembly and seating said locking pins into said pin seats, said holes of said locking arm assembly provide lateral support for said pins.

9. The ladder locking device of claim 8 wherein said spring mechanisms provide downward pressure to push said pins through said holes of said locking arm assembly and seat said pins in said pin seats, locking said locking arm assembly against an associated ladder rung.

10. The ladder locking device of claim 8 wherein said handle rotates on a bearing and rotates said threaded tightening shaft.

11. The ladder locking device of claim 8 wherein said locking arm assembly further comprises a threaded tightening shaft receiver.

12. The ladder locking device of claim 11 wherein said threaded tightening shaft threads into said threaded tightening shaft receiver thus moving said locking arm assembly to a tight locking position against an associated ladder rung.

13. The ladder locking device of claim 8 wherein said locking arm assembly can be extended in length to receive up to five associated ladders.

14. The ladder locking device of claim 8 wherein said hook attached to said body engages an associated ladder rack.

15. A ladder locking assembly, comprising:
   a ladder rack;
   one or more ladders;
   a ladder locking device comprising:
      a body having opposed first and second ends, a hollow section and a longitudinal axis;
      a handle attached to said first end;
      a threaded tightening shaft attached to an end of said handle and secured to said body by a locking clip;
      a hook attached to said first end, said hook engages said ladder rack;
      a threaded key mechanism attached to said second end, said threaded key mechanism comprises a threaded shaft;
      said hollow section comprises:
         first and second guide tracks located on opposite sides of said hollow section,
         a pin retainer body secured to said threaded shaft, said pin retainer body comprises:
         a retaining plate secured to said threaded shaft,
         spring mechanisms located below and engaging said retaining plate, and
         one or more locking pins located below and engaging said spring mechanisms;
      pre-aligned pin seats located in said body which receive said pins; and
      a locking arm assembly extending from said first end to said second end through said hollow section of said body along said longitudinal axis of said body, said locking arm assembly comprising a hook to accommodate up to five of said ladders and holes to accommodate said pins, wherein said threaded key mechanism is rotated by an associated key, thus allowing rotation of said threaded shaft and downward sliding of said pin retainer body along said guide tracks, thus moving said pins through said holes of said locking arm assembly and seating said locking pins into said pin seats, said holes of said locking arm assembly provide lateral support for said pins.

16. The ladder locking device of claim 15 wherein said threaded key mechanism is rotated by an associated key, thus allowing rotation of said threaded shaft and downward sliding of said pin retainer body along said guide tracks, providing downward pressure via said spring mechanisms to push said pins through said holes of said locking arm assembly to seat said locking pins into said pin seats.

17. The ladder locking device of claim 15 wherein said handle rotates on a bearing and rotates said threaded tightening shaft.

18. The ladder locking device of claim 15 wherein said locking arm assembly further comprises a threaded tightening shaft receiver.

19. The ladder locking device of claim 18 wherein said threaded tightening shaft threads into said threaded tightening shaft receiver thus moving said locking arm assembly to a tight locking position against an associated ladder rung.

* * * * *